United States Patent [19]

Schubert et al.

[11] 3,718,211
[45] Feb. 27, 1973

[54] ELECTRIC COUPLING CONTROL

[75] Inventors: Karl P. Schubert, Mayfield Hts.; George R. Rienerth, Fairview Park, both of Ohio

[73] Assignee: Acme-Cleveland Corporation, Cleveland, Ohio

[22] Filed: Sept. 15, 1971

[21] Appl. No.: 180,651

[52] U.S. Cl. ................. 192/12 D, 74/813 C, 82/3, 82/30, 192/84 AA
[51] Int. Cl. ........................................... F16d 67/02
[58] Field of Search ............... 74/813 R, 813 C, 353; 192/84 AA, 84 AB, 18 B, 12 D; 82/3, 30

[56] References Cited

UNITED STATES PATENTS 3,439,552 4/1969 King et al. ......................... 74/353
3,547,240 12/1970 Holper ............................ 192/84 AA

*Primary Examiner*—Charles J. Myhre
*Assistant Examiner*—Randall Head
*Attorney*—Woodling, Krost, Granger & Rust

[57] ABSTRACT

An electric coupling control for a multiple spindle automatic machine is disclosed with the machine having an indexable spindle carrier with a plurality of rotatable spindles. An electric clutch and brake unit is provided for each spindle and the clutch or the brake is selectively energized through a brush and commutator assembly so that selectively either the clutch or the brake may be engaged for a particular spindle for each spindle position of the spindle carrier. The foregoing abstract is merely a resume of one general application, is not a complete discussion of all principles of operation or applications, and is not to be construed as a limitation on the scope of the claimed subject matter.

17 Claims, 5 Drawing Figures

PATENTED FEB 27 1973 3,718,211

INVENTORS
KARL P. SCHUBERT
BY GEORGE R. RIENERTH
Woodling, Krost
Granger and Rust
ATTORNEYS INVENTORS
KARL P. SCHUBERT
GEORGE R. RIENERTH
BY
Woodling, Krost,
Granger and Rust
ATTORNEYS.

ELECTRIC COUPLING CONTROL

BACKGROUND OF THE INVENTION

In multiple spindle automatic machine tools, there is a need to stop one of the multiple spindles in a particular indexed position of the spindle carrier. This usually is for the purpose of working on the workpiece while stationary, for example, a cross-drilling or cross-milling function to be performed on the workpiece. Accordingly, the spindles are usually not driven directly by gearing but instead have interposed a clutch which may be engaged or disengaged. In order to obtain faster production the spindle usually has associated therewith a brake so that the spindle need not coast to a stop and take too long a time. In the past it has been customary to actuate this clutch and brake unit for each spindle by a mechanical lever operated from the main cam system of the machine tool. Mechanical arrangements are subject to considerable wear and tear especially in a high production machine. Also, this usually meant that the clutch and brake unit was hung outboard to the rear of the spindle carrier, adding materially to the length of the entire headstock of the machine tool.

Electric clutches have been attempted on machine tools but in the complexity of a multiple spindle machine there is not only the rotation of the spindles to contend with but the rotation or indexing movement of the spindle carrier itself. Also the environment is hostile to the best operation of electrical equipment in view of the lubricating oil or cutting oil used in the machine tool. Attempts have been made at using some form of a commutator and brush assembly to control energization to a clutch on a machine tool and also commutator and brush assemblies have been attempted on machine tools for low current purposes of supplying control signals to or from a rotating part. The deficiencies in the prior art is that large current being applied to an electric clutch for rapid energization thereof has not been satisfactorily resolved for spindles in an indexing spindle carrier in the environment of a multiple spindle automatic bar machine tool which requires fast cycle times in order to be productively competitive.

Accordingly, an object of the invention is to provide an electric coupling control which obviates the above-mentioned disadvantages.

Another object of the invention is to provide electric clutch or brake control of each spindle of a multiple spindle automatic machine.

Another object of the invention is to provide an electric coupling control for a multiple spindle automatic machine which satisfactorily controls both an electric clutch and an electric brake.

Another object of the invention is to provide an electric coupling control for a multiple spindle automatic machine wherein selector means is provided to select either clutch or brake actuation through a brush and commutator assembly.

Another object of the invention is to provide an electric coupling control for a machine tool wherein control means is provided to utilize a low power control circuit to control the power flow to a clutch or brake energization coil.

Another object of the invention is to provide an electric coupling control to de-energize the clutch of each spindle during a material part of the indexing motion of the spindle carrier.

SUMMARY OF THE INVENTION

The invention may be incorporated in an electric coupling control for a multiple spindle automatic machine having means to index a spindle carrier with a plurality of n rotatable spindles therein and having drive means to rotate the spindles, said electric coupling control comprising in combination, a clutch and brake unit including coil means for each of said spindles, each spindle in the spindle carrier having a first connection through the associated clutch to said drive means and having a second connection through the associated brake to the spindle carrier to brake the spindle relative to said spindle carrier, clutch and brake actuation for at least one of said units including, power source means, a brush carrier assembly, a commutator assembly co-acting with said brush carrier assembly, means to establish relative rotation between said assemblies in accordance with indexing movements of the spindle carrier, said commutator assembly having first and second conductor rings, said brush carrier assembly having first and second sets of brushes co-acting with said first and second rings, respectively, said actuation means including means connecting said power source means through said brush and commutator assemblies to energize said coil means in one electrical condition to actuate said one clutch and to energize said coil means in another electrical condition to actuate said one brake, and selector means including said commutator assembly to provide electrical energization to said coil means in each of said spindles for selective clutch or brake actuation.

Other objects and a fuller understanding of the invention may be had by referring to the following description and claims, taken in conjunction with the accompanying drawing.

DESCRIPTION OF THE PREFERRED EMBODIMENT

Figure 1:
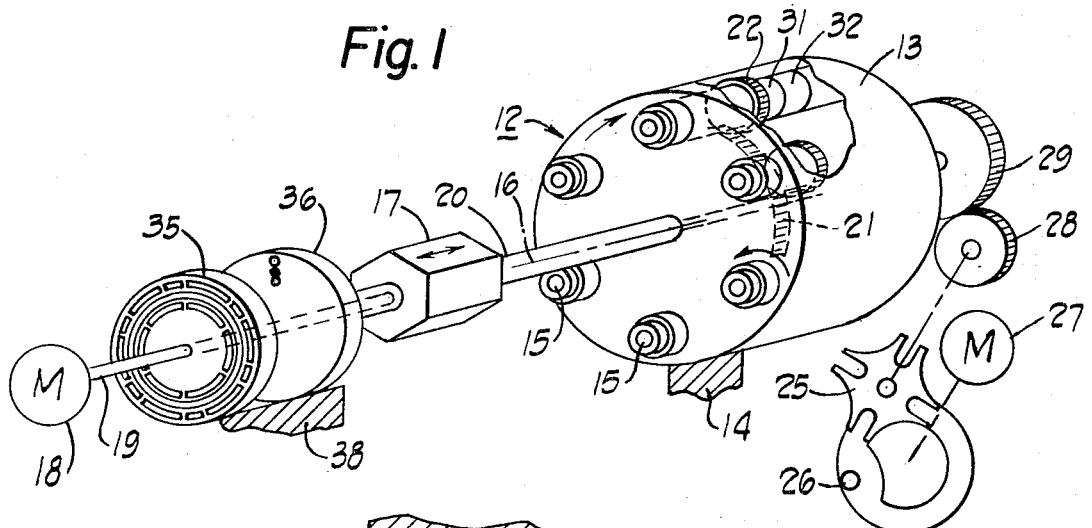
FIG. 1 is a perspective view of the spindle carrier of a machine tool including the brush and commutator assembly illustrating the present invention.
Figure 3:
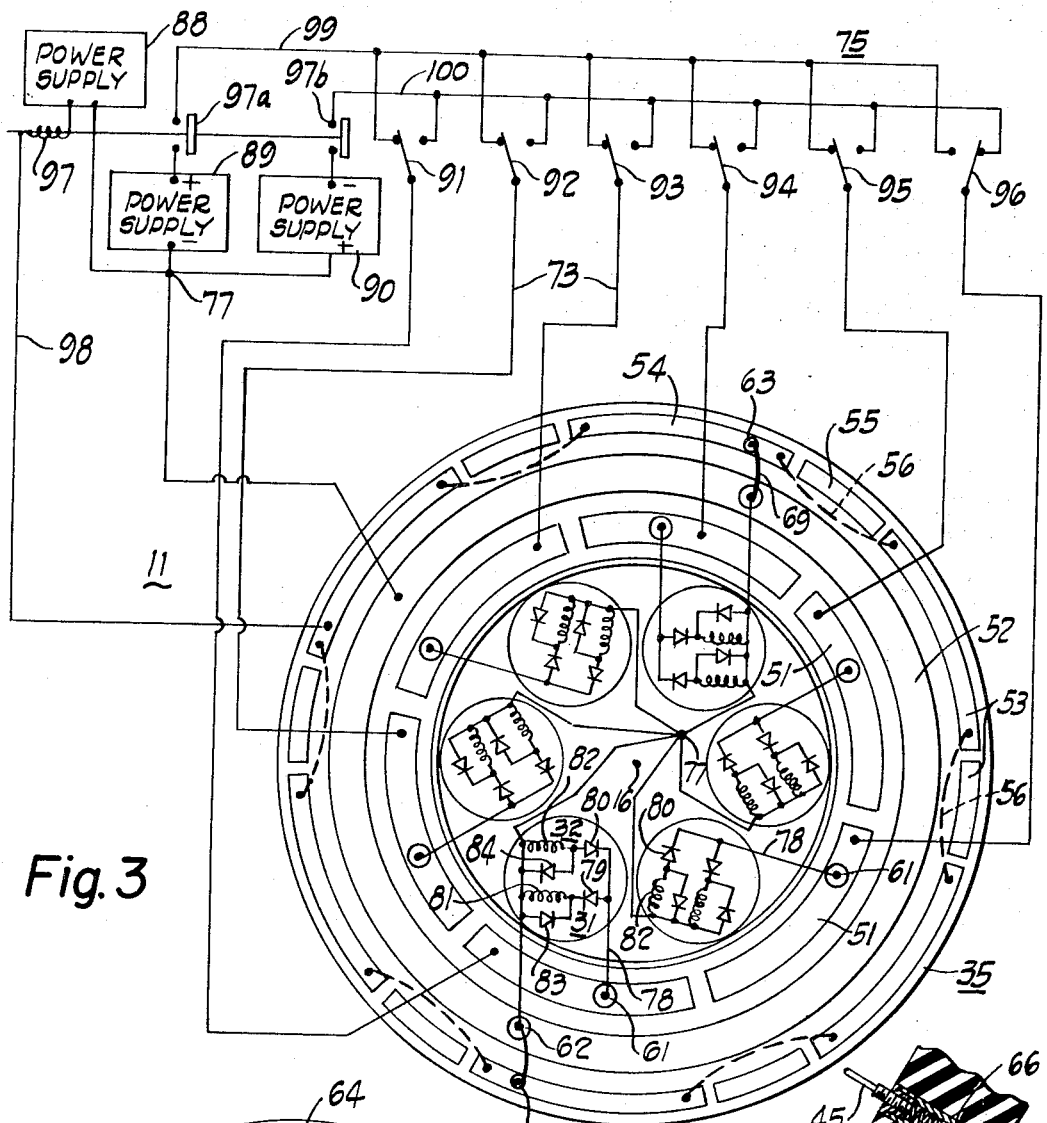
FIG. 3 is an elevational view of the commutator assembly and included therewith a schematic electrical diagram.

An electric coupling control 11 is perhaps best shown in FIG. 3 for use with a multiple spindle automatic machine tool better shown in FIG. 1. The complete machine tool is not illustrated as this may be any of the well known designs for multiple spindle machines and in FIG. 1 there is illustrated an indexable spindle carrier 13 journaled in a headstock frame 14 of a machine 12. The spindle carrier 13 carries a multiplicity of spindles shown as six in number in this particular embodiment. The spindles 15 are journaled on axes parallel to the spindle carrier axis 16. The spindles 15 in the usual manner carry workpieces, either chucked workpieces or long bar workpieces passing through the spindles and these workpieces, not illustrated, extend to the left of the spindles in FIG. 1 into a tooling area to be worked on by the usual tools of the machine tool. As an example, tools may be mounted on an end tool slide 17 which may reciprocate along the axis 16 to carry the tools to and from the workpieces in the spindles. Drive means to rotate each of the spindles is provided and this is illustrated by a motor 18 which may be in the gear box or left end of the machine in this view of FIG. 1. Motor 18 drives through a spindle drive shaft 19 passing coaxially inside of a spindle carrier stem 20 to a central drive gear 21. Gears such as gear 22 are coaxially journaled on each of the plurality of spindles 15, and these gears, six in this case, mesh with the central gear 21.

Means is provided to index the spindle carrier 13 and this is illustrated as a Geneva cross 25 indexed by a drive roller 26 driven from any suitable source such as the motor 18 or, as illustrated, by the motor 27. The Geneva cross 25 is connected through gears 28 and 29 to index the spindle carrier 13 an appropriate amount, 60° in this case of six spindles. Each spindle is provided with a clutch 31 and a brake 32. Each spindle 15 in the spindle carrier has a first connection through the associated clutch 31 to the drive gear 22 and has a second connection through the associated brake 32 to the spindle carrier 13 to brake the spindle relative to this spindle carrier. FIG. 1 at the left end also shows a commutator assembly 35 which in this preferred embodiment is stationary and a coacting brush carrier assembly 36 which is fixed to the carrier stem 20 to rotate with the indexing of the spindle carrier 13. In this manner relative rotation between the assemblies 35 and 36 is provided in accordance with the relative indexing movement of the spindle carrier 13.

Figure 2:
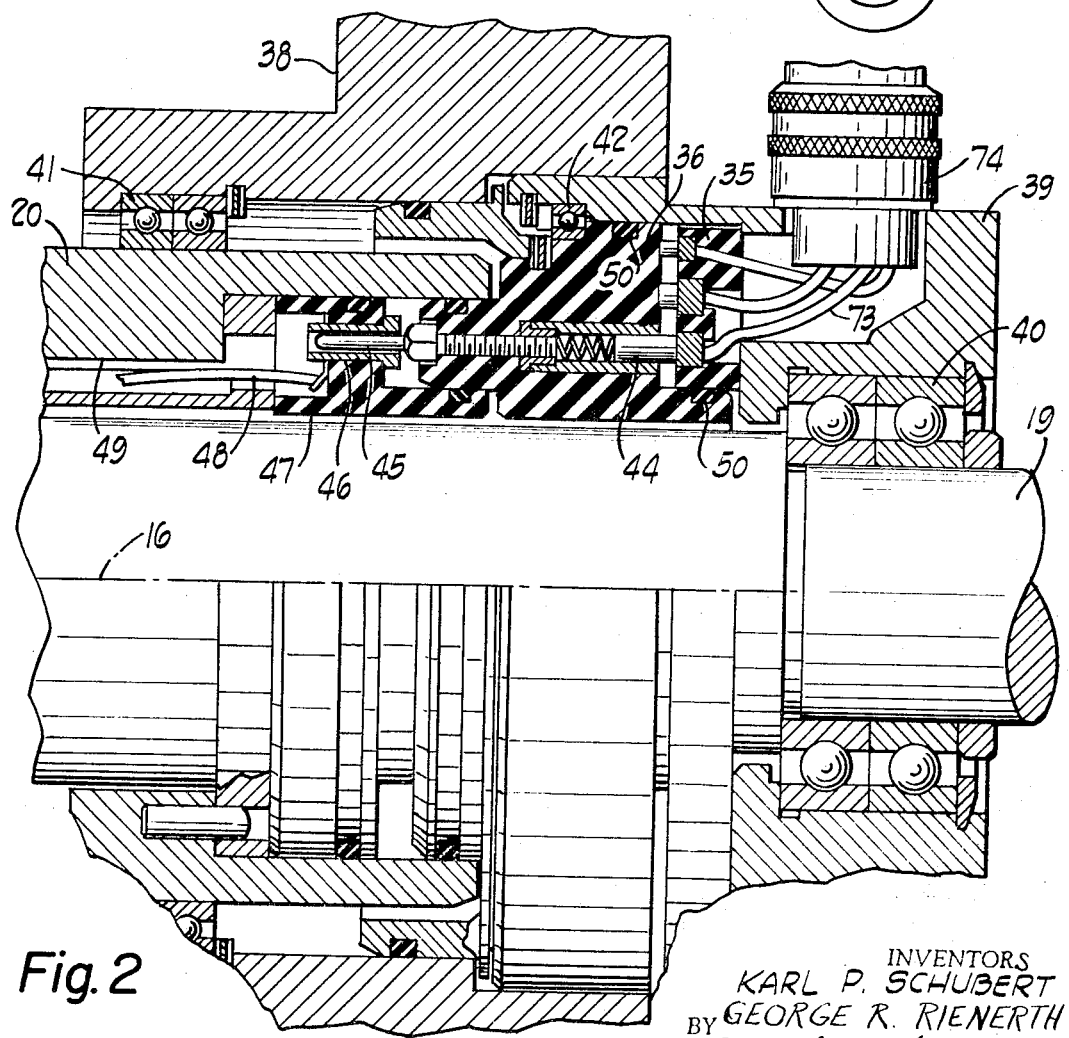
FIG. 2 is a partial view partly in longitudinal section through the brush and commutator assembly.

FIG. 2 shows partly in elevation and partly in section the detailed construction of the commutator assembly 35 and the brush carrier assembly 36. FIG. 2 shows a wall 38 of the gearbox and this may be a part of the frame of the machine tool 12 and may be the gearbox rear wall, remote from the front wall adjacent to the tooling area in which the end tool slide 17 is disposed. A hub 39 is fixed to this gearbox wall 38 with bearings 40 therein journaling the spindle drive shaft 19. The spindle carrier stem 20 is also journaled by bearings 41 in the gearbox wall 38 and this carrier stem coaxially surrounds the spindle drive shaft 19. The commutator assembly 35 is a flat disc or washer which is fixedly secured in any suitable manner in the hub 39.

The brush carrier assembly 36 is journaled by means of bearing 42 inside the gearbox wall 38 or in this case, inside the inner end of the hub 39 to rotate relative to the commutator assembly 35. The brush carrier assembly 36 is secured to the spindle carrier stem 20 in any suitable manner to rotate therewith. FIG. 2 shows that the electrical connections obtained from the brushes of the brush carrier assembly 36, for example, brush 44 are electrically connected to plugs 45 telescoped within sockets 46 mounted in a sleeve 47 which is fixed to the carrier stem 20. These are axially parallel and permit dis-assembly of the machine tool. The connections from the various sockets, there are eight in this preferred embodiment, lead to conductor wires 48 disposed within a channel 49 in the carrier stem 20. This prevents interference between the wires 48 and the rotating spindle drive shaft 19. The various conductor wires are directed by this channel 49 through the tooling area into the headstock area within the spindle carrier 13. From here they extend to coils in each of the clutch-brake units 31–32 as explained below with respect to FIG. 3. O-rings 50 are provided on each side of the brush carrier assembly in order to keep lubricating oil, cutting oil and grease out from between the coacting faces of the assemblies 35 and 36.

FIG. 3 shows an elevational view of the commutator assembly 35 which has first, second and third conductor rings 51, 52 and 53, respectively. The first conductor ring is divided into a plurality of arcuate segments equal in number to the number of spindles, in this case six. Each segment has an arcuate extent of approximately $360/n$ where n is the number of spindles. The second conductor ring 52 is a continuous slip ring. The third conductor ring 53 is divided into six groups with each group including a major segment 54 and a minor segment 55. These conductor rings 51 may be conductor materials such as copper embedded in a hardened plastic material for example, to present a smooth surface on which the brushes will ride. Each of the six minor segments 55 are isolated or unconnected whereas all of the major segments 54 are interconnected by embedded conductors 56.

Figure 4:
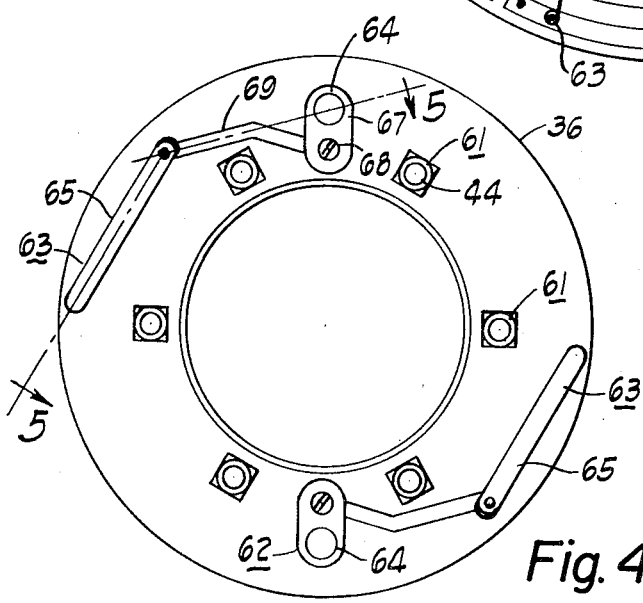
FIG. 4 is an elevational view of the brush carrier assembly.
Figure 5:
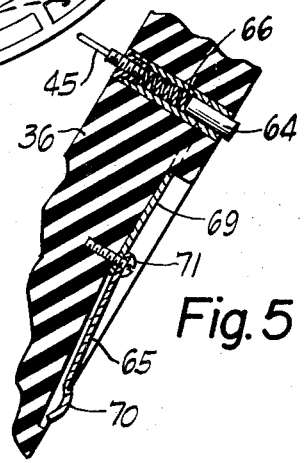
FIG. 5 is a sectional view on line 5—5 of FIG. 4.

FIG. 4 shows an elevational view of the brush carrier assembly 36. This brush carrier assembly has first, second and third sets of brushes 61, 62 and 63, respectively, to coact with the first, second and third conductor rings 51, 52 and 53, respectively. The sets of brushes 61–63 are at different radii with the first set of brushes 61 having the smallest radius relative to the spindle carrier axis 16. There are six brushes 44 in this first set of brushes 61, to coact with each of the six segments of the first conductor ring 51. There are two brushes 64 in the second set of brushes 62 and these are disposed 180° apart for cooperation with the continuous conductor ring 52. There are two brushes 65 in the third set of brushes 63. The cross-section of the brush construction 44 is illustrated in FIG. 2 and a cross-section of the brush construction 64 is illustrated in FIG. 5. This brush 64 is mounted in a metal tube 66 to which a tab 67 is secured and this tab is connected by a screw 68 to a strip conductor 69 which leads to the brush 65. As shown in FIGS. 4 and 5, this brush 65 may be a resilient metal strip having a contact end 70 to engage the third conductor ring 53. A screw 71 interconnects the strip conductor 69 and the brush 65 and mounts this brush 65 in place in the brush carrier assembly 36. The screws 68 and 71 are recessed below the face surface of the brush carrier assembly 36 so as not to interfere with the contacting function of the brushes relative to the commutator assembly 35.

In FIG. 2 a plurality of conductors 73, in this case eight in number, lead from the commutator assembly 35 through a connector fitting 74 fixed on the hub 39 up to a control panel 75, not shown in FIG. 2 but shown in FIG. 3. In FIG. 2 there are shown a plurality of conductors 48 leading from the brush carrier assembly 36 through the channel 49 to the spindle carrier 13. These conductors 48 may be eight in number or actually may be only seven in number because there may be only one for each of the six brushes in the first set of brushes 61 plus one common lead from the interconnected set of brushes 61 and 63. This common lead is numeral 77 in FIG. 3. FIG. 3 includes not only the elevational view of the commutator assembly 35 but also schematically shows the six clutch and brake units, one for each spindle. These are diagrammatically shown inside the hollow center of the commutator assembly 35 but it will be realized these are physically placed inside the spindle carrier 13. Each of the clutch-brake units 31-32 are the same and only one will be described, namely, that at the seven o'clock position of FIG. 3. The clutch 31 has a clutch coil 81 for energization thereof to engage this clutch. The brake 32 has a brake coil 82 for energization thereof to actuate this brake. A conductor 78 is connected to the respective brush of the first set of brushes 61. A diode 79 is connected in a polarity to conduct current from the conductor 78 through the clutch coil 81 to the common lead 77. A diode 80 is connected in series with the brake coil 82 and is polarized to conduct current from the common lead 77 to the conductor 78. A back diode 83 is connected in parallel with the clutch coil 81 in conducting opposition to diode 79. A back diode 84 is connected in parallel with the brake coil 82 in conducting opposition to the diode 80.

The control panel 75 is shown at the top of FIG. 3 and may be mounted in some convenient place on the machine tool 12, for example, near the top where it is out of the way of the tooling area and more removed from the lubricating and cutting oil. This control panel 75 includes power supplies 88, 89 and 90, selector switches 91-96 to which the conductors 73 extend and a relay 97 having contacts 97a and 97b. The relay 97 has a coil connected between one terminal of the power supply 88 and a conductor 98. The other terminal of the power supply 88 is connected to the common lead 77. This common lead 77 is connected to the continuous conductor ring 52 and a conductor 98 is connected to the interconnected major segments 54 of the third conductor ring 53. The power supply 89 has a positive terminal connected through the relay contacts 97a to a positive bus 99 and the power supply 90 has a negative terminal connected through the relay contacts 97b to a negative bus 100. The remaining terminals of the power supplies 89 and 90 are connected to the common lead 77. Each of the selector switches 91-96 is connected by means of one of the conductors 73 to a respective one of the six arcuate segments of the first conductor ring 51. Accordingly, each of the selector switches forms a part of a selector means to select either clutch or brake condition of the respective clutch-brake unit 31-32 of the associated spindle 15. Switches 91-95 are shown in the clutch position or condition and switch 96 is shown in the brake condition. This is merely for illustration. The selector switches 91-95 accordingly are connected to the positive bus 99 and the switch 96 is connected to the negative bus 100.

OPERATION

The electric coupling control 11 of the invention controls the clutch and brake actuation selectively for each spindle 15 in the spindle carrier 13 of the machine tool 12. The selector switches 91-96 plus the six individual segments of the first conductor ring 51 may be considered a selector means to provide electrical energization to the coils 81 and 82 of the clutch-brake unit 31-32 in each of the spindles. There is relative rotation between the brush and commutator assemblies 35 and 36 in accordance with the relative indexing movement of the spindle carrier 13. In this preferred embodiment this is accomplished by having the commutator assembly 35 fixed on the frame 38 and having the brush carrier assembly 36 fixed to the stem of the spindle carrier to rotate therewith. The brush 62 contacting the second conductor ring 52 is a continuous slip-ring connection for continuous electrical conduction of this common lead 77. For normal machine functions in the machine tool 12 it is usual that all spindles rotate, and are worked on by slowly moving tools, for example, those which might be held in the end tool slide 17.

To establish the rotation of each of the spindles where rotation is desired, the associated clutch 31 is engaged. To engage this clutch the clutch coil 81 is energized. For example, the first selector switch 91 may be moved to the clutch position as shown in FIG. 3 whereat it is connected to the positive bus 99. In this condition a positive voltage is applied to the respective arcuate segment of the first conductor ring. The first spindle position of the spindle carrier 13 may be that associated with the 7 o'clock position of FIG. 3. With this negative voltage applied to the 7 o'clock segment of the first conductor ring 51, it is led via the brush 61 to conductor 78. This is a positive voltage relative to the common lead 77 which is connected to the continuous conductor ring 52. This positive voltage on conductor 78 flows through diode 79 and clutch coil 81 to energize the clutch 31. The remaining clutches in the second through fifth spindle positions are also conditioned by the selector switches 92 through 95 to have the clutches therein energized when the spindle carrier is in one of its indexed positions.

During certain operations, for example, during cross-drilling, tapping or other work machining functions, it is necessary to stop a particular spindle in a particular spindle position. For example, each spindle may be required to be stopped as it is indexed into the sixth spindle position. This may be at a position corresponding to the 5 o'clock position of FIG. 3. Accordingly, the sixth selector switch 96 establishes a brake condition by establishing a negative potential from negative bus 100 on the 5 o'clock position segment of the first conductor ring 51. This is a negative voltage applied by the brush 61 on the conductor 78 and is a negative voltage relative to that of the common lead 77 which is positive relative thereto. This positive voltage on common lead 77 is accordingly applied through the brake coil 82 and diode 80 to energize this brake 32. From the above it will be readily determined how each of the clutch-brake units may selectively be controlled for actuation of either the brake or the clutch, depending on the position of the selector switch 91-96.

Control means may be considered to include the third conductor ring 53 to control the flow of energy to the coils 81 and 82. The third conductor ring 53 is shown as having a smaller radial width than the first and second conductor rings 51 and 52 and this is because only low current on the order of twenty milliamperes need flow through this conductor ring. Perhaps 5 to 10 amperes may flow through the conductor rings 51 and 52 in order to properly energize the clutch and brake coils 81 and 82. Low voltage is used to comply with safety regulations, for example, 24 volts. In order to get enough wattage to quickly actuate the clutch and brake coils, between 5 and 10 amperes may be applied to these coils. The indexing motion of the brush assembly 36 is relatively slow, not nearly as fast as the ordinary snap switch or toggle switch which typically is used in electrical applications to switch electrical currents. Because of this relatively slow movement, and because of the inductive reactive effects of the coils 81 and 82, there would be considerable arcing between the brushes and the conductor rings at the ends of the arcuate segments, especially as the circuit was broken. The present invention avoids this by using the control means of the third conductor ring 53. The major segments 54 are separated circumferentially by the isolated or unconnected minor segments 55. These minor segments are included only to provide a physically smooth surface for the brushes 63 to ride on, but could be omitted so far as electrical characteristics are concerned. All the major segments 54 are electrically interconnected by the embedded conductors 56. The circumferential physical spacing of the ends of adjacent major segments 54 means that electrically this is a non-shorting contact with respect to the coacting brushes 63. By non-shorting is meant that the brush is not sufficiently wide to bridge the gap between the ends of adjacent major segments 54. When the spindle carrier 13 is in one of the six indexed positions, then the brushes 63 will be in engagement with diametrically opposite major segments 54. Shortly after the indexing motion starts by means of the Geneva cross 25, the brush 63 will move off the end of one of the major segments 54. This interrupts the control circuit and de-energizes the relay 97. This de-energizes the positive and negative buses 99 and 100 to de-energize at least those clutch-brake units which will undergo a change in clutch-brake condition for the next indexed position. In the preferred embodiment this interrupts the flow of power to all of the clutch and brake coils 81 and 82. As shown in FIG. 3 the major segments are about forty degrees and the minor segments are about twenty degrees which is of sufficient arcuate extent to make sure that the clutch coil or brake coil, whichever was previously energized, has time to completely de-energize. By this is meant that the flux in the core of the clutch or brake will collapse because the current can continue to flow in the respective clutch or brake coil 81 or 82 by flowing through the associated back diode 83 or 84. This de-energization is for a material portion of the indexing motion, namely about one-third of such indexing motion. Prior to the completion of the indexing movement the brushes 63 will again engage the ends of the next adjacent major segment 54 and this will re-energize relay coil 97 closing contacts 97a and 97b to again energize the clutches or brake coils as selected by the position of the selector switches 91–96.

This control means thus assures that the electrical contacting and interrupting of the circuit will be accomplished by the relay 97 and contacts 97a and 97b. Thus whereas the conductor rings 51 and 52 and brushes 61 and 62 carry current most of the time, no actual switching is accomplished by this brush and commutator assembly. Because the power switching of large currents is eliminated in the commutator there is no arcing or burning of the ends of these arcuate segments hence long life is achieved. This is extremely important in the hostile environment of the machine tool where long life through million of cycles is required without any maintenance.

In this preferred embodiment the clutch and brake coils 81 and 82 are stationary relative to the spindle carrier and need no slip ring connections. The switches 91–96 are double-throw switches to select either a positive or a negative condition. The diodes 79 and 80 are unidirectional conducting means connected in opposite polarity relative to the power source means 89–90 to establish conduction through only one of the coils 81 or 82, dependent on the polarity of the voltage applied thereto. The clutch and brake actuation means includes the power supplies 89 and 90, the commutator and brush assemblies 35 and 36 and the selector means 91–96.

Since there are six spindles in this particular embodiment illustrated in the drawing the major segments being 40° are determined by being approximately 360/1.5n and the minor segments have an arcuate extent of approximately 360/3n.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electric coupling control for a multiple spindle automatic machine having means to index a spindle carrier with a plurality of n rotatable spindles therein and having drive means to rotate the spindles,
    said electric coupling control comprising in combination,
    a clutch and brake unit including coil means for each of said spindles,
    each spindle in the spindle carrier having a first connection through the associated clutch to said drive means and having a second connection through the associated brake to the spindle carrier to brake the spindle relative to said spindle carrier,
    clutch and brake actuation for at least one of said units including,
    power source means,
    a brush carrier assembly,
    a commutator assembly co-acting with said brush carrier assembly,
    means to establish relative rotation between said assemblies in accordance with indexing movements of the spindle carrier,
    said commutator assembly having first and second conductor rings,
    said brush carrier assembly having first and second sets of brushes co-acting with said first and second rings, respectively,
    said actuation means including means connecting said power source means through said brush and commutator assemblies to energize said coil means in one electrical condition to actuate said one clutch and to energize said coil means in another electrical condition to actuate said one brake, and selector means including said commutator assembly to provide electrical energization to said coil means in each of said spindles for selective clutch or brake actuation.

2. An electric coupling control as set forth in claim 1, wherein said coil means is stationary relative to the spindle carrier.

3. An electric coupling control as set forth in claim 1, wherein said brush carrier and commutator assemblies are coaxial with the spindle carrier.

4. An electric coupling control as set forth in claim 1, wherein said selector means includes a double throw selector switch for each spindle and having clutch and brake conditions, and said actuation means including connections through said clutch and brake conditions of said selector switch for establishing said clutch and brake actuation, respectively.

5. An electric coupling control as set forth in claim 4, wherein said selector means includes selecting a positive and a negative supply voltage from said power source means for said clutch and brake actuation, respectively.

6. An electric coupling control as set forth in claim 1, wherein said selector means includes said first conductor ring being divided into n segments, a double throw selector switch connected to each commutator segment having clutch and brake conditions, and said actuation means including connections through said clutch and brake conditions of said selector switch to each segment for establishing said one and said another electrical condition thereon for clutch and brake actuation, respectively.

7. An electric coupling control as set forth in claim 1, wherein said power source means includes first and second power supplies, and means in said selector means selecting the connection of said first and second power supplies to said coil means to select said clutch and brake actuation, respectively.

8. An electric coupling control as set forth in claim 1, wherein said coil means includes a clutch coil and a brake coil, first and second unidirectional conducting means connected in series with said clutch and brake coils, respectively, and connected in opposite polarity to said power source means to establish conduction through only one of said coils dependent on the polarity of the power source means voltage applied thereto.

9. An electric coupling control as set forth in claim 1, including control means to control the flow of energy to said coil means in accordance with the indexing of the spindle carrier.

10. An electric coupling control as set forth in claim 9, wherein said coil means includes means to de-energize the coil means for said one clutch and brake for a spindle undergoing a change of clutch-brake condition during a portion of the indexing movement between indexed positions of the spindle carrier.

11. An electric coupling control as set forth in claim 9, wherein said coil means includes means to de-energize the coil means for both said clutch and brake for each spindle during a substantial portion of the indexing movement between indexed positions of the spindle carrier.

12. An electric coupling control as set forth in claim 9, wherein said control means includes relay means having contacts to control the flow of power to said coil means, and control switch means establishing de-energization of said relay during a substantial portion of the indexing motion of the spindle carrier and establishing energization of said coil means prior to completion of the indexing motion.

13. An electric coupling control as set forth in claim 9, wherein said control means includes said brush carrier and commutator assemblies to establish selective switching in accordance with indexing the spindle carrier.

14. An electric coupling control as set forth in claim 13, wherein said control means includes a third conductor ring in said commutator assembly, and a third set of brushes in said brush carrier assembly for cooperation with said third conductor ring.

15. An electric coupling control as set forth in claim 14, wherein said third conductor ring includes non-shorting contacts relative to said third brush set to establish interruption of the energization to said coil means of both said clutch and brake for each spindle.

16. An electric coupling control as set forth in claim 15, wherein said third conductor ring includes $n$ arcuate segments, the ends of adjacent segments being spaced apart a distance greater than the width of a brush in said third brush set.

17. An electric coupling control as set forth in claim 16, including said segments in said third conductor ring being major segments, minor segments included in said third conductor ring alternating with said major segments, means electrically interconnecting said major segments, said minor segments being electrically unconnected, said major segments being of an arcuate extent of approximately $360/1.5n$ and said minor segments being of an arcuate extent of approximately $360/3n$.

* * * * *